Dec. 3, 1929.   S. A. BURRIS   1,737,568
TRACTOR
Filed Feb. 13, 1928    3 Sheets-Sheet 3
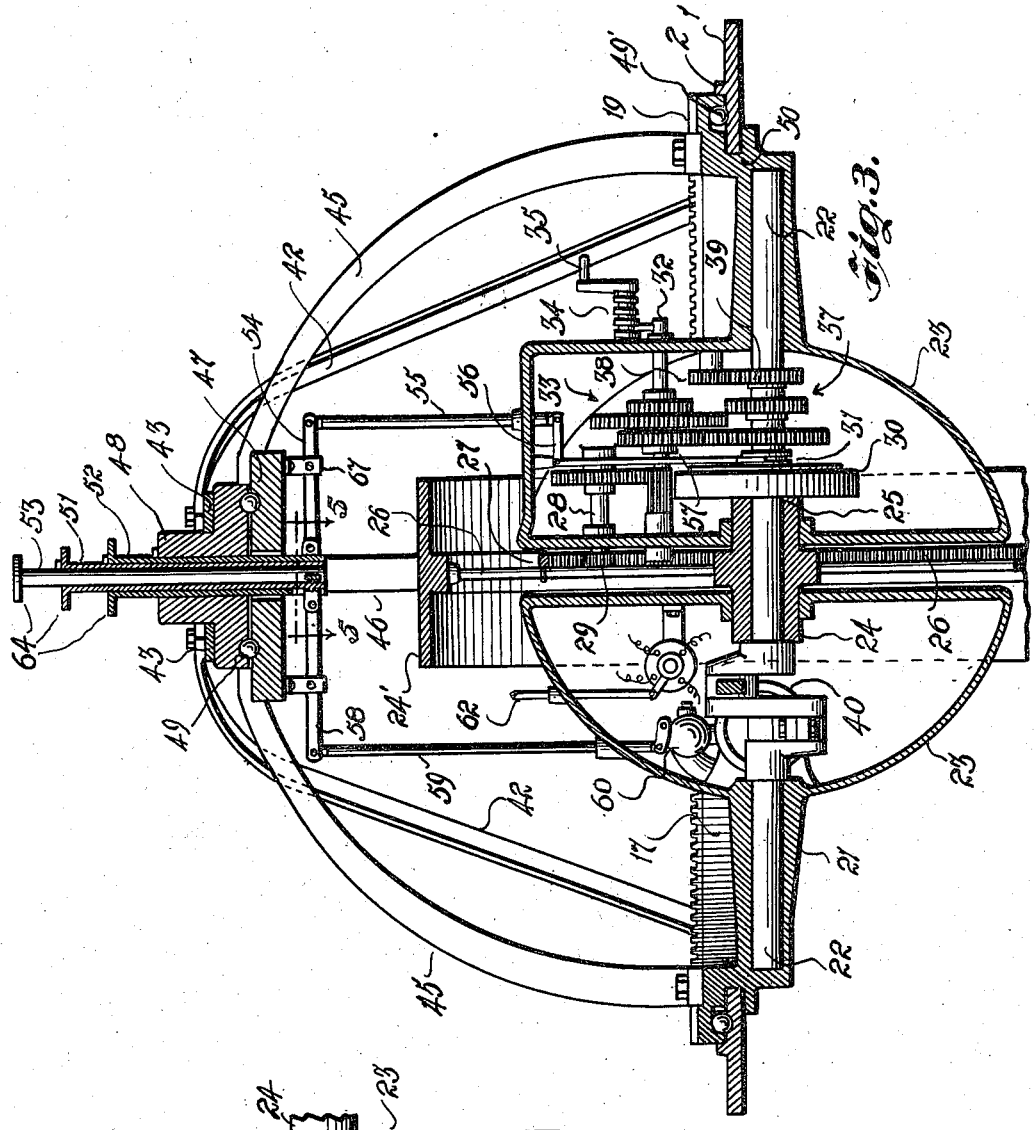
S. A. Burris
INVENTOR
BY John M. Spellman
ATTORNEY Patented Dec. 3, 1929

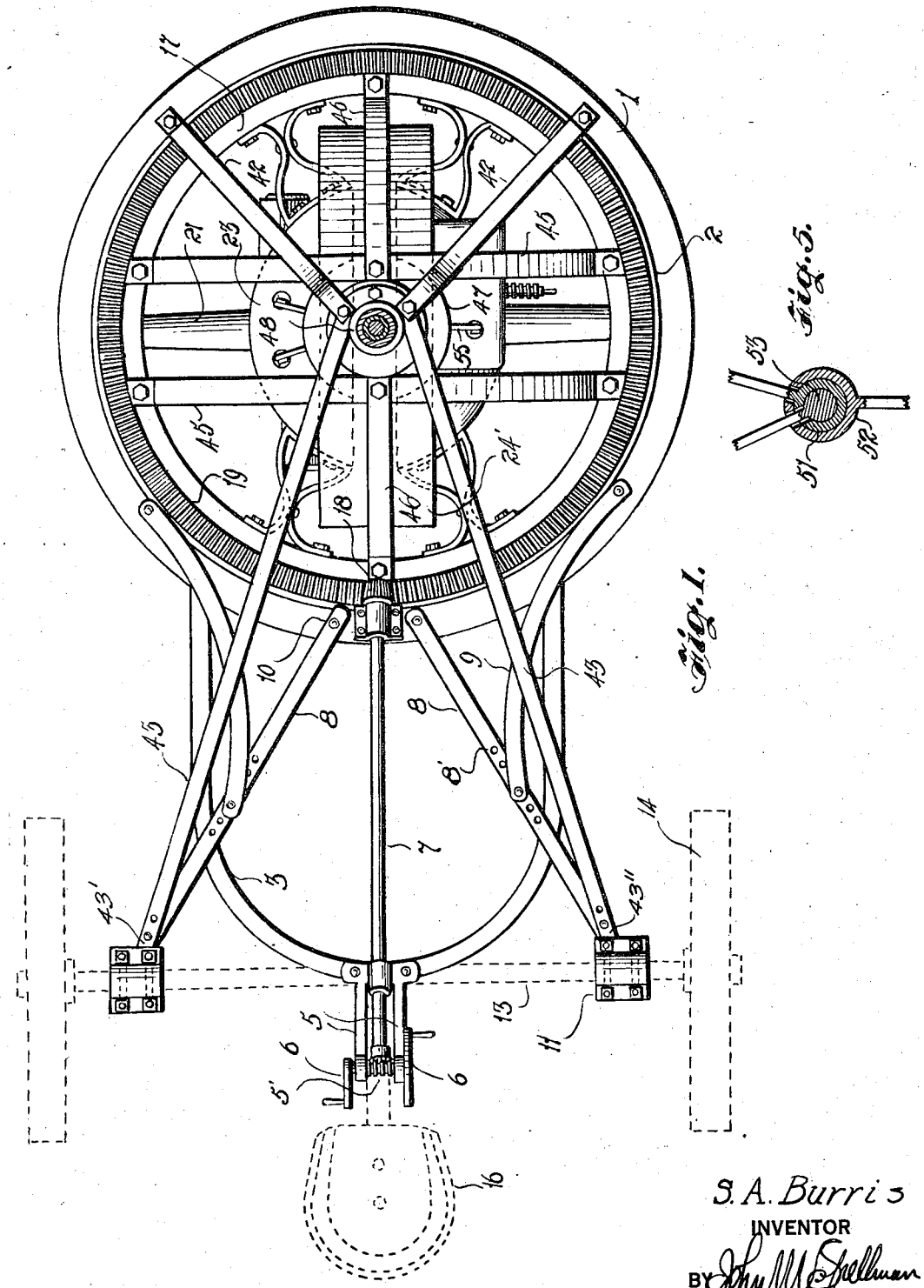

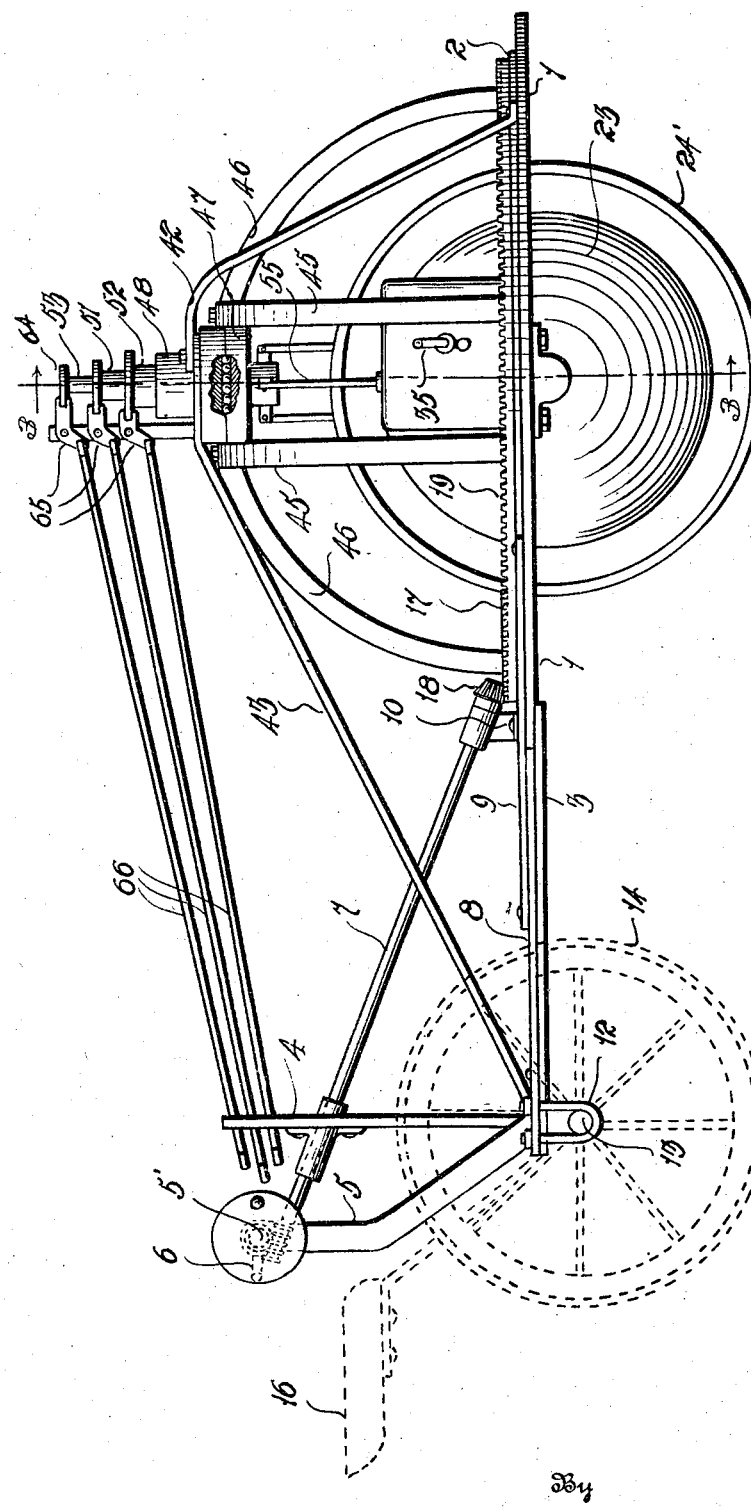

1,737,568

UNITED STATES PATENT OFFICE

STEPHEN A. BURRIS, OF JOURDANTON, TEXAS

TRACTOR

Application filed February 13, 1928. Serial No. 253,990.

The primary object of this invention is to provide a tractor to meet the demand for a "teamless" farm, taking the place of teams on a farm or road and perform any stationary or portable belt work.

Another object of the invention is to provide a tractor which is capable of being quickly attached to any vehicle or implement drawn by animals by simply connecting two convenient U bolts and one hitch, and the tractor and vehicle or implement then become one rigid unit. The tractor is capable of adjustment to any width, height or length and is simple in construction, flexible, easy of control, light of weight, and in addition has no differential and has direct power when turned at any angle.

A further and important object of the invention is that the tractor itself has only one wheel which is the drive wheel, and when connected to any vehicle the wheels of the latter form the means of supporting on a substantially horizontal plane the tractor and parts in cultivating and the like.

A still further object of the invention is that it is operated by power derived from a gasoline or coal oil engine, with two or more opposed cylinders, the entire engine and gears being enclosed in a dust-proof hemispherical drum on either side of its drive wheel.

A most important object of this invention is to create a tractor by which row crops can be cultivated to maturity without danger of breaking them down. This applies especially to such crops as corn, maize, sorghum, etc.

With the above and other objects in view the invention will be clearly understood from a perusal of the following detailed description, taken in connection with the accompanying drawings and wherein:

Figure 1 is a plan view of the tractor, partly in section.

Figure 2 is a side elevational view.

Figure 3 is an enlarged transverse vertical sectional view, taken on the line 3—3 of Figure 2.

Figure 4 is a plan view of the engine cylinders, the crank shaft being shown in section; and Figure 5 is a horizontal sectional view, taken on line 5—5 of Figure 3, showing in part the mechanism for operating the spark, throttle and clutch.

Referring more closely to the drawings and wherein different numerals are employed to designate the various parts, 1 denotes a circular and stationary frame with a central annular rib 2. Connected to the circular frame 1 is a U-shaped element 3 on which is attached an upright member 4 and two spaced angular members 5, on the latter of which is mounted a short shaft 5', including crank handles 6 for imparting rotation to a rod 7. Associated with the U-shaped and extensible portion of the frame are rods 8 and curved bars 9. The rods 8 are connected to the circular frame 1 on opposite sides of the lower end of the rod 7, being bolted to the frame 1 by bolts 10, and the outer ends of these rods 8 are connected to bearings 11 in connection with the U-bolts 12. The bearings and U bolts are provided for the seating of the axle 13 of an implement, the wheels 14 thereof forming a support for the framework of the tractor when in use. The rod 7 (which will be referred to again hereinafter and the object thereof described) is thus within easy reach of the operator occupying the seat 16 of the implement.

The rods 8 and the curved bars 9, while providing added rigidity to the frame, enable the bars 8 to be adjusted as to length and width, as will be apparent by the plurality of perforations 8' in the rods 8.

A revoluble frame 17 is arranged to travel around under impulsion of a gear on the end of the rod 7, the gear being indicated at 18 and in mesh with the teeth 19 on frame 17. The frame 17 is provided with hollowed parts 21 which provide an axle housing and bearing for a crank shaft 22, the engine parts being enclosed by the hemispherical casing 23, divided into two parts as shown in Figure 3.

Spaced between the hemispherical casing and projecting inwardly therein is a hub 24 of the drive wheel 24' the spokes 26 radiating from the hub. The central portion of the crank shaft indicated at 25 thus revolves through the wheel hub. The wheel 24' is arranged to rotate by means of a large gear or "bull" gear 26, bolted at 27 to the spokes of the drive wheel, the teeth of this gear being on the inner periphery thereof. A shaft 28, disposed within the casing, carries a spur gear 29 which meshes with the large bull gear in imparting rotation thereto.

To the crank shaft is permanently affixed the fly wheel 30 and arranged to operate within the fly wheel is a clutch 31 of the internal expanding type.

A slidable counter-shaft 32 carries the gears indicated generally at 33 and for the purpose of sliding these gears there is provided also worm gear 34 operated by the crank 35. By this arrangement the lower set of gears indicated generally at 37 are put into and out of mesh with gears 33 in the gear shifting operation. Since all these gears are of a common type and well known in operation, it is believed no further explanation will be needed in this connection. It may be added, however, that the order of transmission is from reverse to low and from low to high gear and back. Reverse gear is obtained by means of an idle gear 38, which is always in mesh with gear 39.

In Figure 4 are shown a pair of opposed cylinders 40, disposed on either side of the drive wheel and which through their piston rods 41 rotate the crank shaft.

Referring again to the stationary frame 1, in order to provide proper stability and rigidity for this frame, brace rods 42 and 43 are arranged so as to connect the frame with the upper portion carrying blocks (referred to hereinafter) and to the rear framework, the manner of connection being clearly shown in Figures 1 and 2. The rods 43 may be adjusted in relation to the bearing plates 11 and rods 8 by means of the bolts 43' and holes 43''. The revoluble frame 17 is also braced by the curved bars 45 and 46 and are likewise connected to the blocks 47 and 48.

The block 47, better shown in Figure 3, is thus firmly held in proper position above the frames 1 and 17 so that it can rotate with the frame 17 when the wheel 24' is being steered. Between the blocks 47 and 48 are interposed ball bearings to provide easy rotation, and also between the frame 1 and frame 17 are likewise placed ball bearings 49'. It will be observed from Figure 3 that the two circular frames are interlocked by means of the annular recess in frame 17, indicated at 50, and the rib 2 prevents dislodgment of one rim or frame from the other also.

Referring now to the means for operating the throttle, spark and clutch: In Figure 3 it will be seen that the block 48 is centrally bored to admit the tubular members 51 and 52, which are hollow, one fitting over the other, and including the third element in this assembly, viz: the rod 53. Member 52 is connected to an arm 54, rod 55, bell cranks 56 and 57 and controls the clutch. The member 51, adapted to slide inside member 52, has likewise an arm 58, connected to rod 59, and operates the throttle or gas feed 60. The center member, or rod 53, is similarly connected to a rod 62 and controls the spark.

Each of these slidable members as will be clearly seen from Figure 2, have a circular formation 64 and in connection with an angular pivoting member 65 are pivoted each to the rods 66, the outer ends of which are supported upon the upright 4, and within easy reach of the driver's seat.

In the operation of the tractor, the bearings 11 are connected to an implement axle, such vehicle being indicated by the dotted lines in Figure 1, also in Figure 2, and the tractor and vehicle or implement made into a rigid unit. The engine may be started by means of the crank 35 and the gears are also shifted likewise. The tractor may be quickly turned at any angle by means of the cranks 6, and the spark, clutch and throttle are controlled by manipulation of the rods 66, as each of the arms 54 and 58, likewise the rod 62, are pivoted to the lower block 47, as indicated at 67. The tractor may be made to reverse, either by throwing the gear into reverse, or by rotating the circular frame and drive wheel half way around the circle and propelling by direct gear power.

While the present construction shows a practical operating machine, obviously changes may be made, in keeping with the appended claims.

What is claimed as new is:

1. A tractor having a frame provided with an annular rotatable element, a single wheel supported from and within said rotatable element to participate in the turning movement thereof, said element having its turning movement about a vertical axis passing centrally through said wheel and the latter functioning both for driving and for steering, a motor supported by said element at one side of said wheel, a shaft extending diametrically across said annular element and having its opposite ends journaled in said element, said shaft forming both the crank shaft of said motor and the axle for said wheel, gearing between said shaft and said wheel at the side of the latter opposite said motor, said wheel having its hub journaled on said shaft between said motor and said gearing, spokes connecting the rim of said wheel with said hub, substantially hemispherical casings secured to said element for enclosing respectively said motor and said gearing, said casings having their opposed flat sides spaced apart to permit rotation of said spokes therebetween, an internal annular gear secured to said spokes, and means for connecting said gearing and said annular gear, said means comprising a gear positioned between said casings for engagement with said annular gear for driving said wheel.

2. In a mechanism of the character described for readily converting a horse-drawn farm implement into a power-driven farm implement, the combination with circular inner and outer frames, rotatable relative to each other; of an extension frame connected to said outer frame; a single wheel supported from and within said inner frame to participate in the turning movement thereof; a motor supported by said inner frame, gearing between said motor and said wheel; said extension frame including adjustable members associated therewith and pivoted to said outer frame; bearing plates secured to the outer ends of certain of said adjustable members for engagement with the axle of said horse-drawn implement to form a quickly attachable connection therebetween; said adjustable members providing means for holding said plates in desired position to vary the distance between said plates in accordance with the dimensions of the axle; and front and rear brace rods in the front and rear of the machine, said brace rods interconnected at their inner ends to form a portion of the outer frame, and supporting an upper bearing for said inner frame, said rear brace rods being adjustably connected to said adjustable members.

In testimony whereof I affix my signature.

STEPHEN A. BURRIS.